D. K. HAWLEY.
Animal Poke and Hobble.
No. 211,402. Patented Jan. 14, 1879.
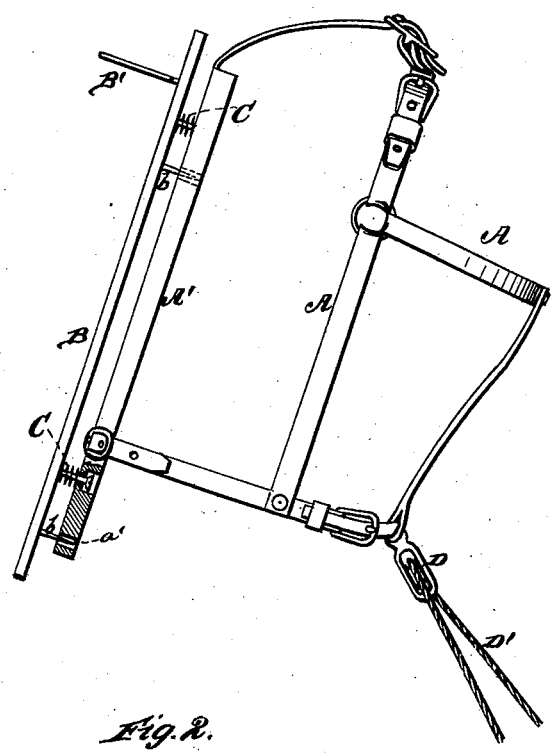
Fig. 1.
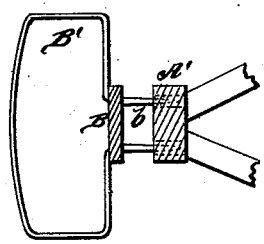
Fig. 2.
WITNESSES
Robert Burritt,
H. Clay Smith
INVENTOR.
David K. Hawley,
By Gilmore, Smith & Co.
ATTORNEYS.

UNITED STATES PATENT OFFICE.

DAVID K. HAWLEY, OF ODIN, ILLINOIS.

IMPROVEMENT IN ANIMAL POKE AND HOBBLE.

Specification forming part of Letters Patent No. 211,402, dated January 14, 1879; application filed November 9, 1878.

*To all whom it may concern:*

Be it known that I, DAVID K. HAWLEY, of Odin, in the county of Marion and State of Illinois, have invented a new and valuable Improvement in Animal Poke and Hobble; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my animal poke and hobble; and Fig. 2 is an end view, partly in section.

My invention relates to a device adapted to prevent animals from jumping or tearing down fences, and butting; and the novelty consists in the construction and arrangement of parts, as will be more fully hereinafter set forth.

In carrying out my invention, I employ any ordinary headstall, of rope, leather, or the like, except that extending down the front. Adapted to lie on the face of the animal is a strip of wood or other material, which provides socket-bearings for two or more pricks, rigidly attached to a removable outer plate, carrying a fender, which is adapted to extend beyond the point of the animal's horns and prevent their use. Spiral springs hold the pricks from the face of the animal until their constant force is overcome by the plate or fender coming in contact with some object consequent upon the impulse of the animal, in which case the animal is hurt by the pricks, and avoids repeating the experiment.

A pulley is secured to the chin-strap of the headstall, through which operates a rope, to each end of which is secured a cuff adapted to embrace the fetlock or shin of the animal. This part of the device allows the animal to travel with but little confinement, the rope working easily in the pulley, but prevents jumping by not allowing the animal to raise its head sufficiently.

The cuffs are readily removable, and may be used as an ordinary hobble by placing both on one fore leg.

Referring to the drawings, A represents the headstall, of any suitable material or construction; and A', the face-plate, having prick-sockets a'. Any device may be employed to secure to this plate a prick-plate, B, having pricks b, and a fender, B'. I have shown a screw with head working loosely in a deep countersink.

Springs C exert a constant force to keep the prick-plate out to the extent allowed by the securing device.

From the chin-strap of the headstall is a pulley, D, within which operates a rope, D', carrying on each end a removable cuff, E, as shown, adapted to embrace the fore legs of the animal.

From the foregoing the operation of my device is obvious.

What I claim as new, and desire to secure by Letters Patent, is—

1. The headstall A, having face-plate A', with prick-sockets a', in combination with prick-plate B, having fender B' and pricks b, with springs C, as shown and set forth.

2. The headstall A, combined with the pulley D, rope D', and removable cuffs E, as specified, for the purpose set forth.

In testimony that I claim the above I have hereunto subscribed my name in the presence of two witnesses.

DAVID K. HAWLEY.

Witnesses:
C. A. WALKER,
E. B. WILCOX.